United States Patent Office 3,560,297
Patented Feb. 2, 1971

3,560,297
PROCEDURE FOR SEALING TOGETHER LIGNOCELLULOSIC MATERIALS
Ernst Ludvig Back, Vikbyvagen 42, Lidingo, Sweden; Karl Gunnnar Norberg, Lerbacksgrand 26, Bandhagen, Sweden; and Frans Ingvar Johanson, Trevebovagen 82, Akersberga, Sweden
No Drawing. Filed Mar. 24, 1967, Ser. No. 625,572
Claims priority, application Sweden, Mar. 30, 1966, 4,224
Int. Cl. C09j 5/00
U.S. Cl. 156—306                                    12 Claims

ABSTRACT OF THE DISCLOSURE

A method for sealing cellulosic and lignocellulosic materials together or to other materials by heating the bonding surfaces of the cellulosic or lignocellulosic materials to at least 250° C. in the absence of added adhesive and maintaining the surfaces at this temperature for a maximum of 30 seconds. The bonding surfaces are then contacted with each other during or immediately after this heating and a pressure is applied.

BACKGROUND OF THE INVENTION

This invention relates to the bonding together of cellulosic or lignocellulosic materials with one another or with other materials.

The sealing together of lignocellulosic materials, whether wood products such as timber boards or veneered products, or paper products containing chemical, semi-chemical or mechanical pulp, such as paper, carton-board, cardboard or fibre building boards, is at present achieved either by mechanical means using, for example, nails, bolts or metal staples, or alternatively by means of an adhesive bonding, where even gummed tapes, pressure sensitive tapes or similar materials may be used. Heat sealing of lignocellulosic materials, such as paper and regenerated cellulose films, has hitherto been technically possible only if the surface has been coated or treated with a layer of adhesive or polymer such as cellulose nitrate which may be heat-sealed according to known methods.

These procedures for sealing together lignocellulosic materials are relatively slow and also have other disadvantages. Mechanical methods such as bolting or nailing can, for example, involve the risk of splitting the material and may require further treatment such as painting or such like. The use of adhesives may involve a long setting time, often under pressure, and the adhesive itself is an additional cost.

It is already known that fibreboards made of lignocellulosic materials lose a sufficiently large proportion of their stiffness under the influence of heat to enable them to be moulded (patent prophylaxis 27/65 in Industritidningen Norden, Industriell Teknik 93 (1965) 260). During heat-treatment pyrolytic, partially exothermal, decomposition reactions rapidly occur in the material. The material becomes discolored, carbonises and rapidly loses its strength. If the heat of reaction is not immediately removed the material may even ignite spontaneously. Because of these disadvantages the treatment of lignocellulosic materials at high temperatures has been considered a hazardous and unmanageable operation, the use of which for heat-sealing has been judged impossible and not even worth studying.

SUMMARY

It has now surprisingly been observed that lignocellulosic materials if heated to temperatures above 250° C. and preferably above 350° C., develop adhesive properties which can be utilized for heat-sealing if the heating time is kept so short that no, or only slight, decomposition of the material here occurs. In this way bonding may be achieved with lignocellulosic materials either with themselves or with similar or other, preferably hydrophilic materials. A bonding pressure of at least 5 kg./cm.$^2$ is usually required for satisfactory bonding. After rapid cooling, a bond formed in this way exhibits a strength of the same order of magnitude as that of the lignocellulosic material itself. Such heat-sealing of lignocellulosic materials thus requires the addition of no adhesive or other binder and permits the bonding together of two or more layers in the same operation.

The distinctive feature of the invention is that the cellulosic material's bonding surface is raised to a temperature of at least 250° C. and is maintained at this temperature for not more than one minute, and that the bonding surfaces are brought into contact with each other under pressure during or immediately after the heating process, after which the pressure necessary for contact may, but need not necessarily, be applied during all or part of the cooling time. The cellulosic material's temperature is preferably maintained at a minimum of 280° C. for a maximum of 30 seconds. The conditions are especially favourable if the temperature is maintained at a minimum of 280° C. and a maximum of 500° C. for at most 3 seconds. The higher the temperature of the material's bonding surface, the shorter is the time during which the material may and need to be kept at that temperature, in order for a satisfactory bond to be established.

The optimum relationship between the time of heating, the temperature and the applied pressure during bonding has been found to vary somewhat with variations in the proportions of lignin, hemicellulose and cellulose in the lignocellulosic materials and with variations in these components' molecular weights and structures. Chemical pulp and a high cellulose content require a temperature of at least 350° C. and at most 500° C. for a maximum of 10 seconds. With higher lignin and hemicellulose content, as found for instance in mechanical pulp and wood products, the bonding surface can be held at a temperature of at least 300° C. and at most 450° C. during a period of not more than 15 seconds and preferably not more than 10 seconds. Hardwood products require somewhat lower, and softwood products somewhat higher, temperatures.

A bonding pressure of at least 1 kg./cm.$^2$ and preferably between 20 and 250 kg./cm.$^2$ must be applied. An increase in the applied pressure enables both the temperature and the heating time to be reduced. The moisture content of the lignocellulosic material is of no fundamental importance for the process. The heating time is slightly longer for moist materials, while the required bonding temperature is sometimes somewhat lower.

The bonding of a lignocellulosic material to another material is most easily accomplished if the latter material is preheated. Further, the bonding occurs more easily if the second material has a to a high degree hydrophilic surface, which need not however be in a plastic condition. It is, for example, possible to carry out such bonding to metallic surfaces, which should however preferably be first cleaned from grease. Heating of the second material is not absolutely necessary.

The resultant seal is to a large extent independent of the means by which the heat has been conveyed to the bonding surface. The result is most satisfactory if the heating of the lignocellulosic material occurs as rapidly as possible and is well localised to the bonding area itself. The sealing can be carried out by bringing the materials into contact with each other under a slight pressure even during the heating stage, after which the actual bonding pressure is applied within the above-mentioned, characteristic temperature ranges.

DESCRIPTION OF THE PREFERRED EMBODIMENTS

In practice it has been found to be desirable to choose somewhat different heating methods for different lignocellulosic materials. For thin materials such as paper, board, veneers and such like, heating can be achieved by leading the heat through the material itself to the bonding surfaces, for example by conduction from the devices by whose agency the bonding surfaces of the materials are pressed against each other. For discontinuous sealing operations clamping devices or tongs may be used with constant temperature bars or impulse heated bars having smooth or grooved clamping surfaces. The pattern of the grooves—their depth, distance apart and profile—is chosen with reference to the type and thickness of material to be sealed, and also to the purpose of the bond. In some cases, in order to retain a desired pattern and to avoid crushing the seal, it has been found appropriate to carry out the sealing under high pressure but with a constant press gap. The gap width depends amongst other things on the nature of the material, its thickness and the character of the pattern desired. The press gap can be maintained constant by means of, for example, spacers or stopscrews.

The procedure involving the conduction of the heat through the material itself on its way to the bonding surface gives rise, however, to a certain degree of discoloration on the outside of the material in the vicinity of the seal. Since such discoloration is often a disadvantage and, furthermore, the transfer of heat to the underlying bonding surfaces through thicker materials is a time-consuming process, it is often preferable to heat up the bonding surfaces by direct means. This can, for example, be achieved by passing the materials over a wedge-shaped heating tool followed by pressure rollers, as described for example in Example 7. In this way it is possible to achieve a symmetrical heating of, for instance two continuous webs which are to be sealed together by a continuous process. Another method is to pass the webs over heated and if necessary driven rollers and cylinders, possibly even augmented by spring-loaded steel bands which run parallel to the web and permit a longer press time. The heating time can in such systems also be varied by altering the diameter of the rollers, the degree of wrap round and the length of the steel belt. The rollers can be heated by, for example, electricity, gas or oil.

Heating can also be carried out by blowing a gas, such as air or an inert gas, heated to a sufficiently high temperature directly onto the bonding surface, or by conveying heat to the surface in the form of radiant heat or other radiation energy, such as laser, the heating being carried out in both cases immediately before the application of the bonding pressure.

When a very short heating time is desired, or when sealing together thick materials, heating can advantageously be carried out with microwaves or in some other high-frequency electric field. Using this technique, other substances' electromagnetic properties can be taken advantage of, for instance when sealing paper to metal such as aluminum foil.

Another heating techniques is to press the bonding surfaces together while cold, after which at least one of the surfaces is brought into a state of rapid movement by means of ultrasonic vibrations, or alternatively into rotation with the aid of a spindle having a high revolution rate. In this case heating occurs due to friction between the bonding surfaces. When a suitable temperature has been attained in the bonding surfaces, the movement is rapidly stopped and the sealing carried out under pressure.

An alternative procedure when bonding wood is to bring the still cold bonding surfaces into contact with each other and to insert a number of very thing, metallic electrical resistance wires into the bonding region. Heating is carried out by passing an electric current through the wires, which thus heat the bonding surfaces to the required bonding temperature. Thereafter the current is switched off and the bond is cooled under the appropriate pressure, while the wire or wires are left in the bond.

It is in most cases an advantage if the bond can rapidly be cooled down to a temperature below, say, 100° C. This can be done by allowing the bonded material, perhaps under pressure, to come into contact with cold rollers or plates, or by means of a stream of cold gas, which may be either air or an inert gas.

It is even advantageous to carry out the sealing operation in an inert atmosphere, in which case the inert gas is, for example, first used as a cooling gas and flows in the direction opposite to the materials' direction of travel. An inert atmosphere can be obtained using nitrogen or possibly water vapour. Bonding in an inert gas leads to less discoloration of the materials and often permits the use of a higher bonding temperature and consequently a shorter bonding time.

ILLUSTRATIVE EXAMPLES

Without thereby limiting the scope of the invention, a number of examples of bonding carried out by this procedure are here appended, together with data concerning the strength of the bonds produced. Unless otherwise stated, the results refer to tensile tests carried out on test strips with the force applied in the plane of the strip, i.e. in shear parallel to the bonding surface. The straining speed was 4 mm./min. The bonds are simple lap—joints and the bonding area is considered equal to the apparent contact area. The bond strengths are give in kg./cm.$^2$ of bonding surface.

Example 1

15 mm. wide strips of birch veneer of thickness 0,8 mm. having an intrinsic strength of 7 kg./cm. width and a mositure content of 12%, were pressed against each other between heated plane steel clamps, constant heat bars, whose temperature was varied between 350° C. and 450° C., during heating times which varied between 3 and 15 seconds. The bonding pressure at the start of the operation was 100 kg./cm.$^2$, but was reduced during the heating period so that the soft material should not be squeezed out of the pressure nip. The following strengths were obtained after cooling and conditioning the seals.

| Temperature, °C. | Time, sec. | Tensile strength, kg./cm.$^2$ |
| --- | --- | --- |
| 350 | 3 | (¹) |
|  | 5 | (¹) |
|  | 15 | (¹) |
| 400 | 2 | 7 |
|  | 3 | 8 |
|  | 5 | 4 |
| 450 | 3 | 3 |

¹ Rupture in the veneer.

Example 2

15 mm. wide strips of, in the first place, 300 g./m.$^2$ kraft liner with a tensile strength of 21 kg./cm. width and a moisture content of 7.2% and, secondly, a 300 g./m.$^2$ mechanical pulp board with a strength of 17 kg./cm. width and a moisture content of 6.8%, were sealed between constant heat bars by the same procedure as that described in Example 1. In this case, however, the bars had a double row of grooves 0.2 mm. deep, the dimensions of the grooves being 0.2 x 3 mm. and the distance between adjacent grooves 0.8 mm. The strengths recorded after cooling and conditioning the seals were as follows:

| Temperature, °C. | Time, sec. | Tensile strength kg./cm.² at bonding pressure— | | |
|---|---|---|---|---|
| | | 50 kg./cm.² | | 100 kg./cm.², board |
| | | Kraft liner | Board | |
| 300 | 3 | | | 3 |
| | 5 | | | 5 |
| | 10 | | 3 | 9 |
| 350 | 3 | | 3 | 11 |
| | 5 | 4 | 10 | 12 |
| | 10 | 5 | 11 | |
| 400 | 1 | 3 | | 3 |
| | 3 | 6 | 5 | 5 |
| | 5 | 5 | | |
| | 10 | 4 | | |
| 450 | 1 | 6 | | |
| | 3 | 7 | | |
| 500 | 3 | 3 | | |

Example 3

Bundles of tissue paper have been sealed by the same procedure as that used in Example 2. Tissues containing mechanical pulp as well as those consisting entirely of bleached or unbleached sulphate or sulphite pulp of basis weight 15–30 g./m.², and newsprint of basis weight 52 g./m.² and intrinsic strength 2 kg./cm. width, have been used. The bundles contained 10–25 and 5–15 sheets respectively. With a bonding temperature of 350° C., a pressure of 120 kg./cm.², slightly grooved sealing jaws and a heating time of 0.5–2 seconds, bonding strengths greater than the materials' own strength were obtained. This procedure can be used, for instance, in the manufacture of disposable napkins (diapers) and instead of gluing daily newspapers.

Example 4

Samples of hard and porous fibreboards with thicknesses in the range 2–13 mm., were filed away in the bonding region to give symmetrical plane parallel surfaces for the manufacture of lapped joints. The bonding surfaces were pressed against metal plates preheated to 350° C., after which the heated, roughened bonding surfaces were pressed together under a pressure of 100 kg./cm.². The bond strengths are recorded in the following table:

| Type of fibreboard | Thickness, mm. | Heating time, sec. | Strength, kg./cm.² |
|---|---|---|---|
| Hard | 2.0 | 3 | 20 |
| Hard | 3.5 | 5 | 19 |
| Semihard | 10 | 5 | 14 |
| Porous | 13 | 5 | 13 |

Example 5

Between the bonding surfaces of two sample strips of deal having a moisture content of 16% were placed a number of electrical resistance wires of diameter 0.2 mm., arranged parallel to each other with 5 wires per cm. The bond was heated under a pressure of 150 kg./cm.² for 1 minute by passing an alternating current at a frequency of 50 cycles/second through the wires. The wires were not removed after the sealing was completed. After cooling, the strength of the bond when a separating force was applied perpendicular to the plane of the bond was 5 kg./cm.².

Example 6

Using pressboard of density 1.3 g./cm.³ consisting of unbleached sulphate pulp, a rod was made and fixed to a high speed spindle. At a speed of 3000 revolutions per minute this rod was pressed against a stationary sample of the same material. After 30 seconds of this friction treatment the rotation was rapidly stopped, subsequent cooling taking place under continued pressure. The bond which resulted had a strength of 13 kg./cm.² when broken in a direction perpendicular to the plane of the bond.

Two webs of 300 g./cm.² kraft paper were, with the help of rollers and where necessary a steering belt, led over a thermostatically heated wedgeshaped tool under a slight pressure with a speed which varied according to the temperature in the range 2–10 m./min. The surfaces of the paper webs which were thus heated were thereafter pressed together between cold rollers with a linear pressure of 50 kg./cm., and sealing was achieved both with smooth rollers and with rollers having a fine grooved pattern. The bond obtained was completely tight and the outer surfaces showed no significant discoloration. Bond strengths comparable with those reported in Example 2 were obtained.

Example 8

Two webs of newsprint as in Example 3 were led over the heated wedge as in Example 7, at a speed varying between 5 and 20 m./min., dependent on the temperature of the wedge. The heating time thus varied between 0.3 and 1.5 seconds. Bond strengths fully comparable with those reported in Example 2 were obtained.

Example 9

By means of the arrangement described in Example 6 a web of kraft paper was bonded to a web of aluminium foil. Adhesion between the two was established.

Example 10

Samples of 50 mm. wide 300 g./m.² mechanical pulp board with a tensile strength of 17 kg./cm. width and a moisture content of 6.8% were placed under a high pressure of the order of 70 kg./cm.² between two electrodes, preheated to 200° C., between which a high-frequency electric field of 15 megacycles per second and a 3 kv. could be established. After ca. 5 sec. bonding was achieved without external discoloration. The bond obtained had a strength of 6 kg./cm.².

What we claim is:

1. A method for sealing a first material selected from the group consisting of cellulose and lignocellulosic materials to a second material selected from the group consisting of cellulose, lignocellulosic materials and metallic materials, said method comprising (a) heating the bonding surfaces of said materials, in the absence of added adhesive or added water, to a temperature of at least 250 degrees C. and maintaining said bonding surfaces at said temperature for a maximum of 30 seconds and (b) contacting said bonding surfaces at said temperature with each other while applying pressure.

2. The method of claim 1 wherein the bonding surfaces are contacted during the heating.

3. The method of claim 1 wherein the bonding surfaces are contacted immediately after being heated.

4. The method of claim 1 wherein the bonding surface of the first material is held at a temperature of at least 300° C. for a period of time not exceeding 5 seconds.

5. The method of claim 1 wherein the bonding surface of the first material is held at a temperature of at least 325° C. for a period of time not exceeding 1 second.

6. The method of claim 1 wherein the pressure is in the range of 20–250 kgs./cm.².

7. The method of claim 1 wherein the lignocellulosic material is selected from the group consisting of wood, and veneer.

8. The method of claim 1 wherein the cellulose material is selected from the group consisting of chemical, semichemical and mechanical pulp.

9. The method of claim 1 wherein the bonding is carried out in an inert atmosphere.

10. A method as claimed in claim 1 wherein the second material is cellulose.

11. A method as claimed in claim 1 wherein the second material is a lignocellulosic material.

12. A method as claimed in claim 1 wherein the second material is a metallic material.

References Cited

UNITED STATES PATENTS

| | | | |
|---|---|---|---|
| 2,832,267 | 4/1958 | Runckel | 161—269 |
| 2,832,269 | 4/1958 | Runckel | 161—269 |
| 3,134,980 | 5/1964 | Alexander | 156—220 |
| 3,160,543 | 12/1964 | Elmondorf | 156—306 |
| 3,287,205 | 11/1966 | Bugel | 161—268 |

FOREIGN PATENTS

| | | | |
|---|---|---|---|
| 113,711 | 9/1941 | Australia | 156—306 |
| 1,000,130 | 8/1965 | Great Britain | 156—320 |

REUBEN EPSTEIN, Primary Examiner

U.S. Cl. X.R.

161—220, 268